United States Patent
Panchal

(10) Patent No.: US 11,140,743 B2
(45) Date of Patent: Oct. 5, 2021

(54) METHOD AND SYSTEM FOR RESOURCE MANAGEMENT IN MULTI-RAT DUAL CONNECTIVITY ENVIRONMENT

(71) Applicant: Verizon Patent and Licensing Inc., Arlington, VA (US)

(72) Inventor: Jignesh S. Panchal, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 192 days.

(21) Appl. No.: 16/000,180

(22) Filed: Jun. 5, 2018

(65) Prior Publication Data
US 2019/0373670 A1    Dec. 5, 2019

(51) Int. Cl.
*H04W 76/34* (2018.01)
*H04W 76/16* (2018.01)
*H04W 88/06* (2009.01)

(52) U.S. Cl.
CPC ........... *H04W 76/34* (2018.02); *H04W 76/16* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 2014/0064180 A1* | 3/2014 | Kotecha | H04W 80/04 370/328 |
| 2015/0063240 A1* | 3/2015 | Worrall | H04W 72/048 370/329 |
| 2015/0245402 A1* | 8/2015 | Mochizuki | H04W 36/22 370/331 |
| 2016/0192239 A1* | 6/2016 | Salvador | H04W 28/0268 370/331 |
| 2017/0238349 A1* | 8/2017 | Uchino | H04W 76/10 370/329 |
| 2018/0220483 A1* | 8/2018 | Hayashi | H04W 76/15 |
| 2019/0014501 A1* | 1/2019 | Fotiadis | H04L 1/0026 |
| 2019/0053297 A1* | 2/2019 | Shimizu | H04W 76/10 |
| 2019/0141720 A1* | 5/2019 | Ni | H04W 76/10 |
| 2019/0230734 A1* | 7/2019 | Shimojou | H04W 72/04 |
| 2019/0357288 A1* | 11/2019 | Palanisamy | H04W 8/04 |
| 2020/0084655 A1* | 3/2020 | Fiorani | H04W 24/08 |
| 2020/0100313 A1* | 3/2020 | Chang | H04W 76/32 |
| 2020/0267799 A1* | 8/2020 | Lee | H04W 80/10 |

* cited by examiner

*Primary Examiner* — Gregory B Sefcheck
*Assistant Examiner* — Amarnauth G Persaud

(57) ABSTRACT

A method, a device, and a non-transitory storage medium are described in which resource management service is provided. The resource management service may include monitoring the state of radio bearers of a master wireless station and a secondary wireless station. The master wireless station may release or not release the secondary wireless station based on the state of the radio bearers. The secondary wireless station may report the state of a radio bearer to the master wireless station.

20 Claims, 10 Drawing Sheets

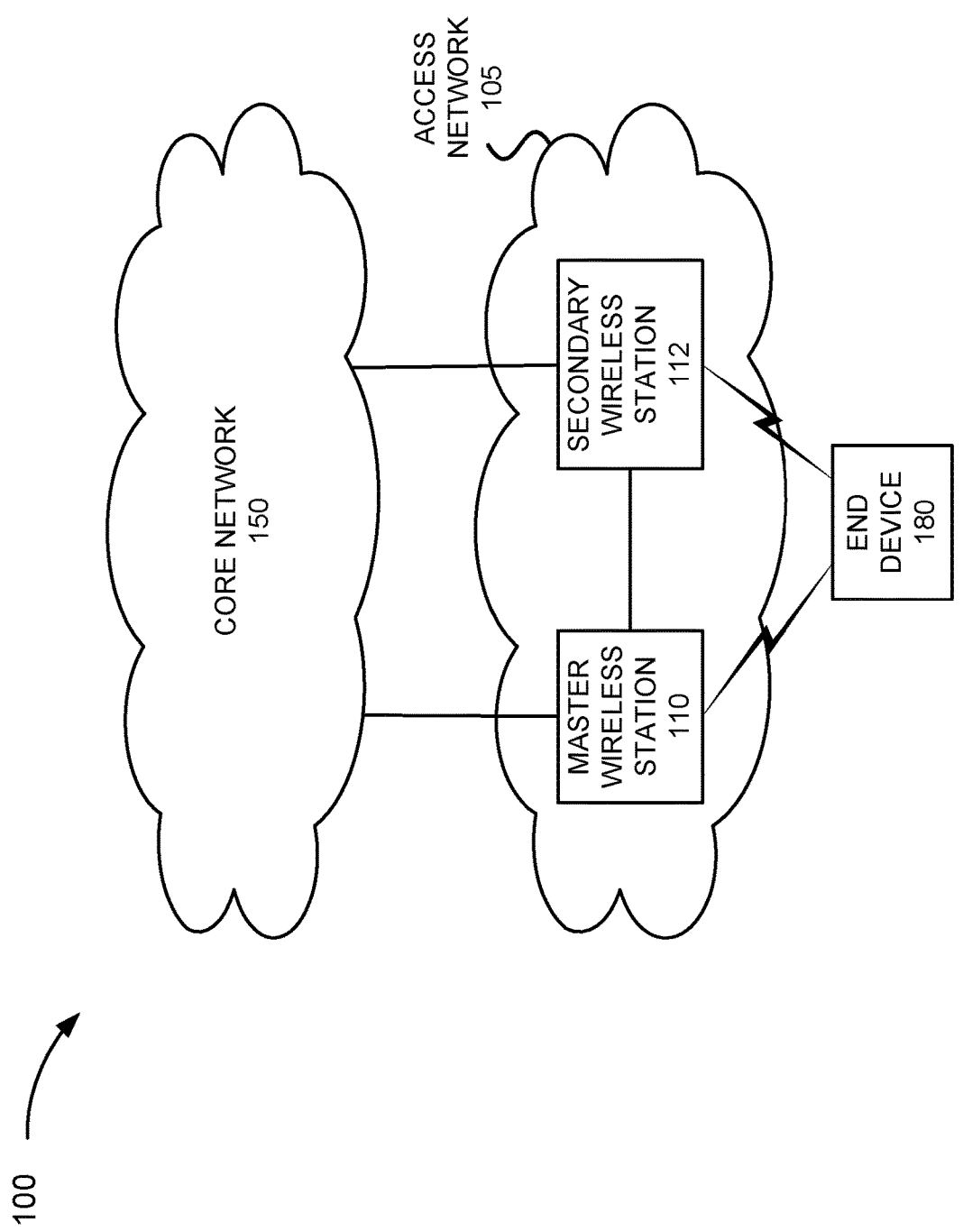

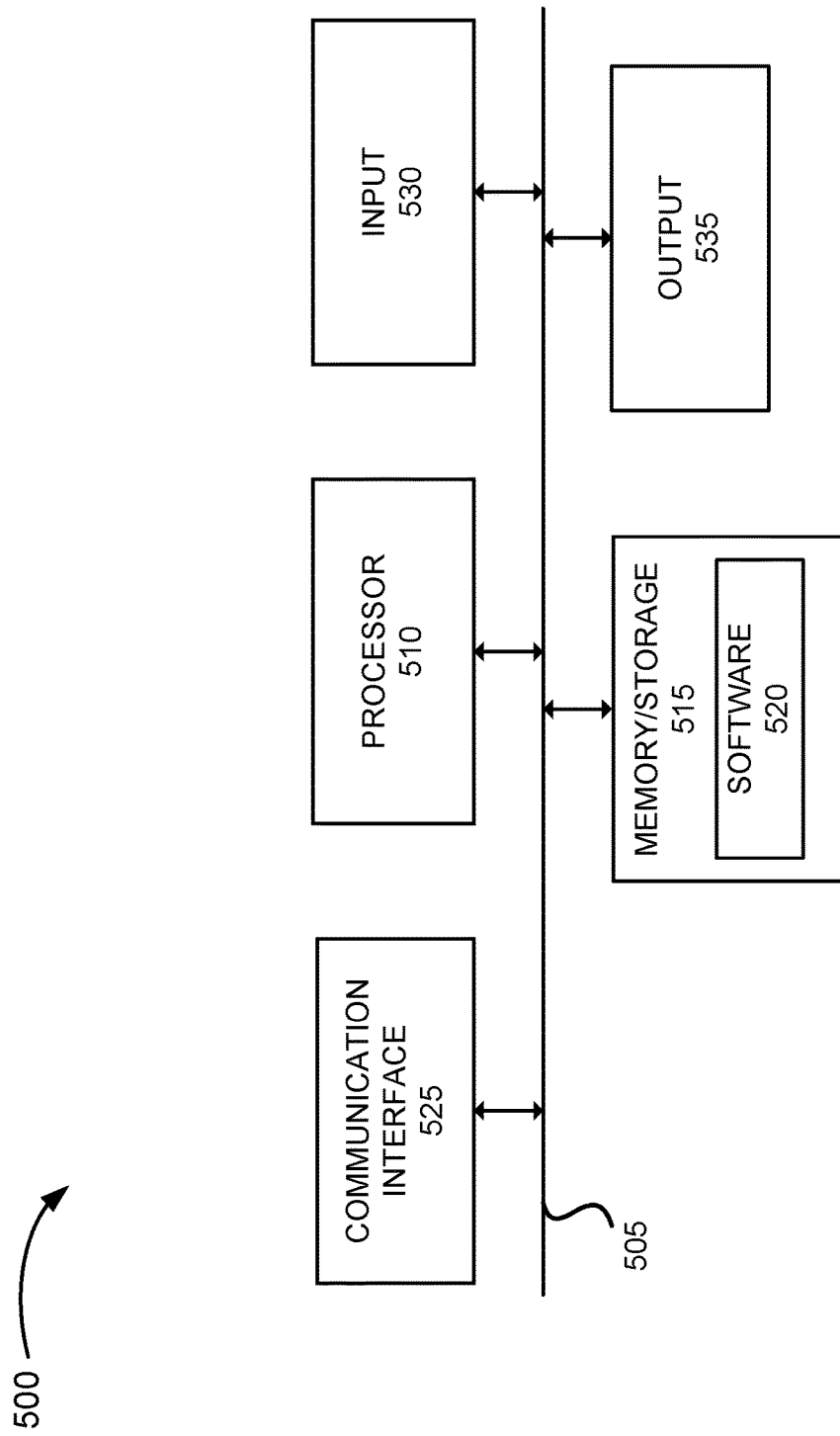

METHOD AND SYSTEM FOR RESOURCE MANAGEMENT IN MULTI-RAT DUAL CONNECTIVITY ENVIRONMENT

BACKGROUND

Development and design of multi-radio access technology (RAT) access networks present certain challenges from a network-side perspective and an end device perspective. Depending on how internetworking is configured, such configuration can yield undesirable results. For example, from a network perspective, the configuration may reduce effective use of available network resources. Accordingly a need exists to overcome these challenges.

BRIEF DESCRIPTION OF THE DRAWINGS

FIG. 1 is a diagram illustrating an exemplary environment in which an exemplary embodiment of a resource management service may be implemented;

FIG. 5 is a diagram illustrating exemplary components of a device that may correspond to one or more of the devices illustrated and described herein.

DETAILED DESCRIPTION OF PREFERRED EMBODIMENTS

Figure 2A:
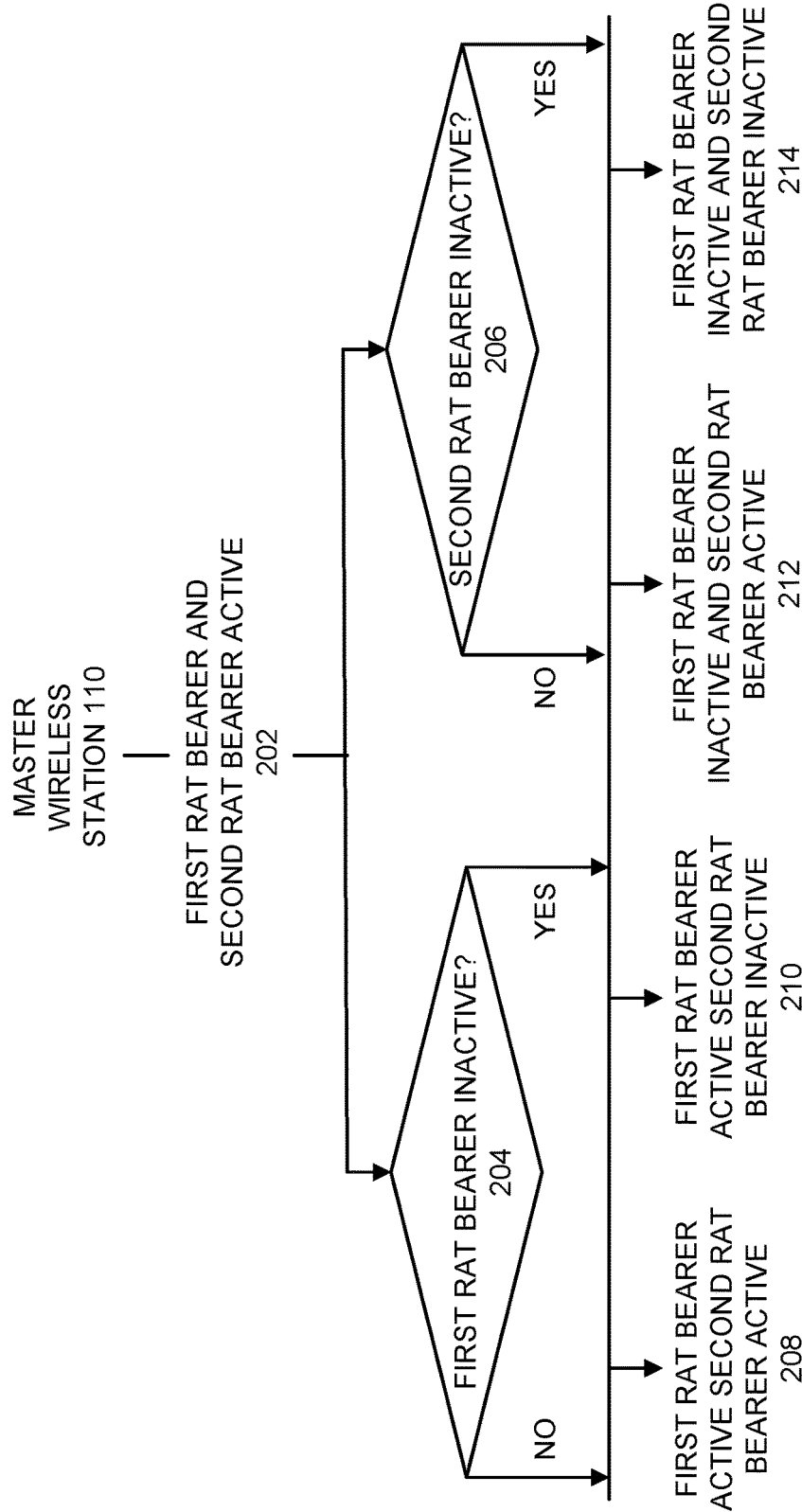
FIG. 2A is a diagram illustrating an exemplary process of an exemplary embodiment of the resource management service performed by a master wireless station.

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. However, in the design of the wireless network, there are legacy issues relating to existing wireless networks. For example, there are considerations relating to whether there will be internetworking between the wireless network, which includes various network devices, and a legacy wireless network, which includes various legacy network devices, and if so, how such an internetworking will be implemented.

Depending on how internetworking is configured, such configuration can yield undesirable results. For example, from a network perspective, the configuration may reduce effective use of available network resources. By way of further example, in an Evolved Universal Radio Access-New Radio (E-UTRA-NR) Dual Connectivity (EN-DC) environment that includes a master node (MN) and a secondary node (SN), the SN (e.g., a secondary next generation Node B (SgNB)) is released when there is user plane inactivity. Subsequently, the SN may be added to a Master Cell Group (MCG), which requires various network-side and end device side procedures to be successfully performed. The toggling between active and inactive states causes migration of a radio bearer to/from the MCG and a Secondary Cell Group (SCG) split because of the network-side release and addition of the SN. As a result, the ping-pong effect may unnecessarily utilize available network resources to support the shift between cell groups, and the establishment and the release of radio bearers, and other backhaul bearers (e.g., data radio bearers (DRBs) to a core network, signaling radio bearers (SRBs), etc.). Additionally, from an end device perspective, the resulting ping-pong effect may unnecessarily utilize available resources of the end device to support the shift between cell groups, and the establishment and the release of radio bearers, and other backhaul bearers (e.g., to a core network, etc.).

According to exemplary embodiments, a resource management service is described. According to an exemplary embodiment, the resource management service may be implemented in a multi-radio access technology (RAT) environment that supports multi-connectivity between a wireless network and an end device. According to an exemplary implementation, the resource management service may be implemented in an EN-DC environment. According to another exemplary implementation, the resource management service may be implemented in a NR-E-UTRA-DC (NE-DC) environment. According to yet another exemplary implementation, the resource management service may be implemented in a Next Generation (NG) radio access network (RAN) E-UTRA-NR DC (NGEN-DC) environment. According to still other exemplary implementations, the resource management service may be implemented in other types of dual or higher connectivity environments that may include additional and/or different RATs.

According to an exemplary embodiment, the resource management service may be implemented in a multi-RAT environment that supports an MCG and an SCG with DC. For example, the MCG may include a primary cell of a MN and one or multiple serving cells of one or multiple SNs. Additionally, for example, the SCG may include a primary cell of a primary SN and may include one or multiple serving cells of one or multiple SNs. According to an exemplary embodiment, the resource management service may be implemented in a multi-RAT environment that supports a split bearer service (e.g., MCG split bearer, an SCG split bearer, etc.).

According to an exemplary embodiment, the resource management service includes a bearer monitoring service. According to an exemplary embodiment, the bearer monitoring service detects the activity and inactivity of each RAT bearer pertaining to an MN and an end device, and an SN and the end device. According to an exemplary embodiment, the activity and inactivity of the RAT bearer pertains to the DRBs (e.g., user data of the user plane) of the lower layers at the MN and the SN. According to an exemplary implementation, the lower layers may include the physical layer, the Medium Access Control (MAC) layer, and the Radio Link Control (RLC) layer. According to other exemplary implementations, the lower layers may include fewer and/or different layers. The bearer monitoring service may determine that the RAT bearer is inactive when there are no user data in both the uplink and the downlink in view of one or multiple criteria, as described herein. Otherwise, the bearer monitoring service may determine that the RAT bearer is active, as described herein.

According to an exemplary embodiment, the bearer monitoring service of the SN may report the status of activity/ inactivity to the MN. According to an exemplary implementation, the SN may generate and transmit a message, which indicates a state of the bearer (active or inactive), to the MN. According to various exemplary implementations, as described herein, the message may include various types of information. In contrast to other approaches, the message from the SN does not request a release when the RAT bearer is inactive.

According to an exemplary embodiment, based on the bearer monitoring service, the resource management service of the MN may determine whether or not to release the SN based on the state of the RAT bearer of the MN and the state of the RAT bearer of the SN. According to an exemplary embodiment, the resource management service of the MN may determine to release the SN when the state of the RAT bearer of the MN is inactive and the state of the RAT of the SN is also inactive. For example, the MN may release the SN and may release itself from an end device when the bearer monitoring service indicates inactivity on the RAT bearers (e.g., a first RAT bearer of the MN and a second RAT bearer of the SN, etc.). Otherwise, the resource management service of the MN may determine to not release the SN. According to one exemplary implementation, the resource management service of the MN may use an SCG split bearer, instead of releasing the SN, when the RAT bearer of the SN is inactive. For example, in an EN-DC context, when the MN provides an LTE bearer to an end device, and the SN provides a NR bearer to the end device, when the NR RAT bearer is inactive, the MN may invoke or maintain the SCG split bearer configuration. In this way, the ping-pong effect may be avoided. Additionally, for example, in the EN-DC context, the resource management service may release the SN and shift to an only MCG bearer configuration when the user plane of the SN to a core network (e.g., an S1-U termination point, etc.), the signaling plane and/or the user plane of the SN with the MN (e.g., an X-2 termination point, etc.), or both changes or may be lost.

As a result, the resource management service may improve network resource utilization in a network. For example, the resource management service may improve the use of various network resources (e.g., physical, logical, virtual) in relation to network devices of an access network or the access network and a core network based on the management of migration of bearers between the MN and the SN, and the management of SN releases, as described herein. Additionally, from an end device perspective, the resource management service may improve resource utilization at the end device by avoiding the execution of an SN release procedure, re-establishment procedures, etc., as well as improve connectivity and network services for the end device by virtue of the SN not being released.

FIG. 1 is a diagram illustrating an exemplary environment 100 in which an exemplary embodiment of the resource management service may be implemented. As illustrated, environment 100 includes an access network 105 and a core network 150. According to other embodiments, environment 100 may include additional networks and/or different types of networks than those illustrated and described herein. Access network 105 includes a master wireless station 110 and a secondary wireless station 112. Environment 100 further includes an end device 180.

The number, the type, and the arrangement of network devices in access network 105 and the number of end devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc).

Environment 100 includes communication links between the network devices, and between the network devices and a network. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 includes one or multiple networks that support multiple RATs. According to an exemplary embodiment, access network 105 may include a 4G radio access network (RAN) (e.g., an Evolved UMTS Terrestrial Radio Access Network (E-UTRAN) of an Long Term Evolution (LTE) network) or a 4.5G RAN (e.g., an E-UTRAN of an LTE-Advanced (LTE-A) network), and a future or next generation RAN (e.g., a 5G-access network (5G-AN) or a 5G-RAN (referred to herein as simply a 5G-RAN)). According to other exemplary embodiments, access network 105 may include additional and/or different RANs and support additional and/or different RATs. For example, access network 105 may include a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

According to yet other exemplary embodiments, access network 105 may include other types of networks, such as a WiFi network, a Worldwide Interoperability for Microwave Access (WiMAX) network, a local area network (LAN), a personal area network (PAN), or other type of network that provides access to or can be used as an on-ramp to core network 150 via master wireless station 110 and/or second wireless station 112.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., RATs), wireless standards, wireless frequencies/bands, and so forth.

Master wireless station 110 includes a network device that supports one or multiple RATs and includes logic that provides the resource management service, as described herein. Additionally, master wireless station 110 includes logic that supports a DC service in which master wireless station 110 operates as a master node. For example, master wireless station 110 may include logic that supports an MCG split bearer service and one or multiple other types of DC services (e.g., SCG split bearer service, an SCG bearer service, an MCG bearer service, etc.). According to various exemplary embodiments, master wireless station 110 may be implemented as an evolved Node B (eNB), an Evolved LTE (eLTE) eNB, a gNB, or another type of base station (e.g., a base transceiver station (BTS), a Node B, a remote radio head (RRH), an RRH and a baseband unit (BBU), a radio network controller (RNC), etc.).

Secondary wireless station 112 includes a network device that supports one or multiple RATs and includes logic that provides the resource management service, as described herein. Additionally, secondary wireless station 112 includes logic that supports a DC service in which secondary wireless station 112 operates as a secondary node. For example, secondary wireless station 112 may include logic that supports an SCG split bearer service and one or multiple other types of DC services (e.g., an MCG split bearer service, an SCG bearer service, and MCG bearer service, etc.). According to various exemplary embodiments, secondary wireless station 112 may be implemented as an eNB, an eLTE eNB, a gNB, or another type of base station (e.g., a BTS, a Node B, an RRH, an RRH and a BBU, an RNC, etc.).

Core network 150 includes a complementary network of access network 105. For example, core network 150 may be implemented to include an Evolved Packet Core (EPC) of an LTE or an LTE-Advanced network, a next generation core (NGC) network, and/or a legacy core network. Depending on the implementation of core network 150, although not illustrated, core network 150 may include various network devices, such as for example, a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described.

End device 180 includes a device that has computational and wireless communication capabilities. End device 180 may be implemented as a mobile device, a portable device, or a stationary device. End device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or other types of wireless user devices. End device 180 may be configured to execute various types of software (e.g., applications, programs, etc.). The number and the types of software may vary among end devices 180. End device 180 may support multiple RATs (e.g., 4G, 5G, etc.), multiple frequency bands, and so forth. Additionally, end device 180 may include one or multiple communication interfaces that provide one or multiple (e.g., simultaneous) connections via the same or different RATs, frequency bands, and so forth. The multimode capabilities of end device 180 may vary among end devices 180.

FIG. 2A is a diagram illustrating an exemplary process of the resource management service. According to an exemplary embodiment, master wireless station 110 may perform the process in which the bearer monitoring service determines the activity and inactivity of each RAT bearer of a cell group. According to various exemplary embodiments, the bearer monitoring service may determine the activity of a bearer continuously (e.g., at all times), according to a schedule, reactively, proactively, periodically, and/or according to another type of administratively configurable instance.

For purposes of description, assume that master wireless station 110 may support the first RAT and second wireless station 112 may support the second RAT. Master wireless station 110 includes the bearer monitoring service and determines the activity/inactivity state pertaining to the first RAT bearer. Also assume that second wireless station 112 includes the bearer monitoring service, and reports to master wireless station 110 its activity/inactivity bearer state pertaining to the second RAT, as described herein. In this way, master wireless station 110 may determine the activity/inactivity state for both the first RAT bearer and the second RAT bearer. For example, master wireless station 110 may determine the activity/inactivity of the first RAT bearer (e.g. an LTE RAT bearer, etc.), and the activity/inactivity of the second RAT bearer (e.g., a NR RAT bearer, etc.).

According to an exemplary embodiment, the determination of whether a RAT bearer is inactive or active may be based on one or multiple criteria. For example, the bearer monitoring service may determine that the RAT bearer is active or inactive based on whether or not there is data to be transmitted to end device 180 via the RAT bearer or data to be transmitted to core network 150 (e.g., received from end device 180 via the RAT bearer). By way of further example, the bearer monitoring service may determine whether a buffer or another type of memory associated with a communication interface of master wireless station 110 or secondary wireless station 112 stores data to be transmitted and/or is currently transmitting pertaining to an end device/session in the uplink and the downlink. When there is data in the uplink, the downlink, or both, the bearer monitoring service may determine that the RAT bearer is active. When there is no data in the uplink and the downlink, the bearer monitoring service may determine that the RAT bearer is inactive. According to another exemplary implementation, the bearer monitoring service may determine when there is no data to be transmitted or no data is currently being transmitted in the uplink and the downlink, whether this state has existed for a threshold period of time. Depending on whether the threshold period of time has been satisfied, the bearer monitoring service may determine whether the RAT bearer is active or not active. According to yet other exemplary implementations, the bearer monitoring service may determine whether a RAT bearer is inactive or active based on a threshold amount of data transmitted during a time period. For example, the bearer monitoring service may be configured with a threshold number of bytes of data to be transmitted during a threshold time period.

According to still other exemplary implementations, the criterion or criteria applied and/or a threshold value associated with a criterion used to determine activity/inactivity may be based on the type of end device (e.g., a smartphone versus an IoT device (e.g., a utility meter)). Additionally, or alternatively, the activity/inactivity determination may be based on a traffic pattern and/or an application that end device 180 uses via the RAT bearer. For example, a utility meter may report usage readings and may use the RAT bearer less frequently than an end user via a tablet may use the RAT bearer when web surfing or using some other type of application. In this regard, the criterion and/or the threshold value of the bearer monitoring service may be configured based on these factors.

Referring to FIG. 2A, according to an exemplary scenario, assume that master wireless station 110 determines that both a first RAT bearer and a second RAT bearer are active 202. Subsequently, master wireless station 110 may determine the state of the first RAT bearer and the second RAT bearer, as illustrated in block 204 and block 206. Depending on the results of these determinations, there are four possible outcomes in which the first RAT bearer is active and the second RAT bearer is active 208, the first RAT bearer is active and the second RAT bearer is inactive 210, the first RAT bearer is inactive and the second RAT bearer is active 212, or the first RAT bearer is inactive and the second RAT bearer is inactive 214. According to an exemplary embodiment, master wireless station 110 does not release the SN (i.e., secondary wireless station 112) from the MCG when the first RAT bearer is active and the second RAT bearer is active 208, the first RAT bearer is active and the second RAT bearer is inactive 210, and the first RAT bearer is inactive and the second RAT bearer is active 212. According to such an embodiment, master wireless station 110 releases the SN from the MCG when the first RAT bearer is inactive and the second RAT bearer is inactive 214. Additionally, master wireless station 110 may perform a Radio Resource Control (RRC) Connection Release procedure for both the first RAT bearer and the second RAT bearer in relation to end device 180. Alternatively, master wireless station 110 may perform the RRC Connection Release procedure for the first RAT bearer, and the SN may perform the RRC Connection Release procedure for the second RAT bearer.

Figure 2B:
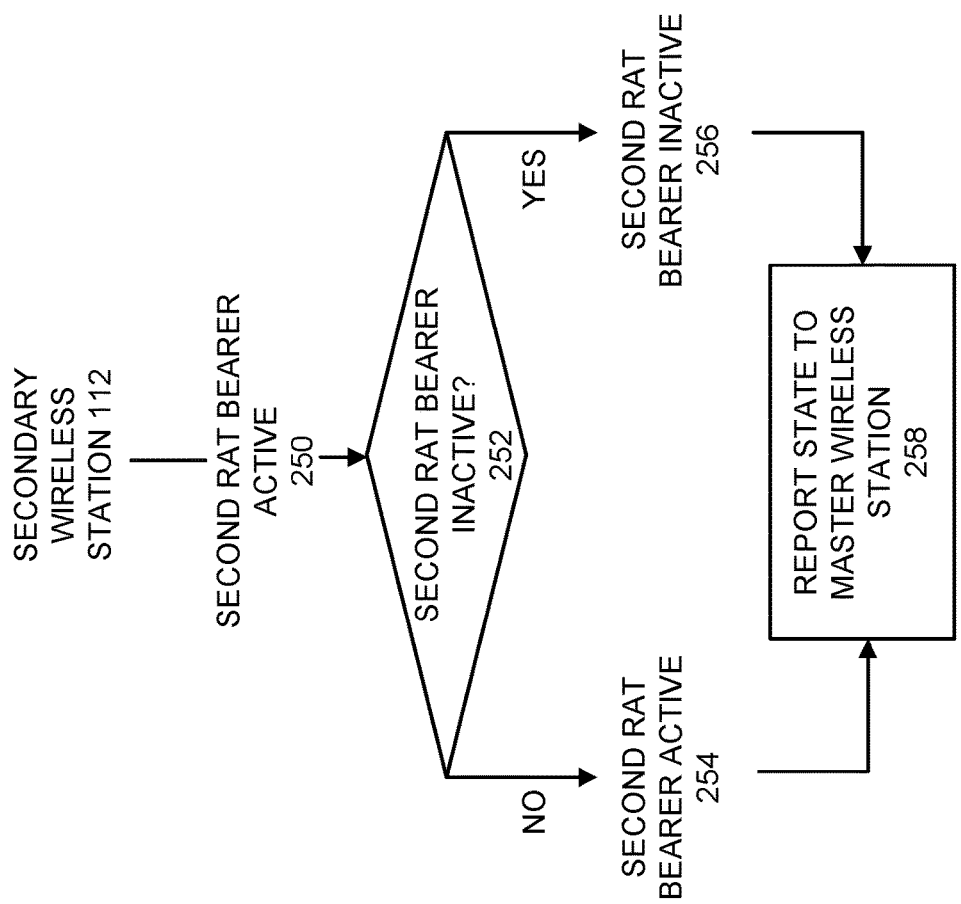
FIG. 2B is a diagram illustrating another exemplary process of an exemplary embodiment of the resource management service performed by a secondary wireless station.

FIG. 2B is a diagram illustrating another exemplary process of the resource management service. According to an exemplary embodiment, secondary wireless station 112 may perform the process in which the bearer monitoring service determines the activity and inactivity of a RAT bearer of a cell group. For example, secondary wireless station 112 determines the activity/inactivity state pertaining to the second RAT bearer.

Referring to FIG. 2B, according to an exemplary scenario, assume that secondary wireless station 112 determines that the second RAT bearer is active 250. Subsequently, secondary wireless station 112 may determine the state of the second RAT bearer, as illustrated in block 252. Depending on the result, secondary wireless station 112 may determine that the second RAT bearer is active 254 or inactive 256. Secondary wireless station 112 may report the state of the second RAT bearer to master wireless station 110, in block 258. This is in contrast to other approaches in which secondary wireless station 112 may request to be released when the second RAT bearer is inactive.

Figure 3A:
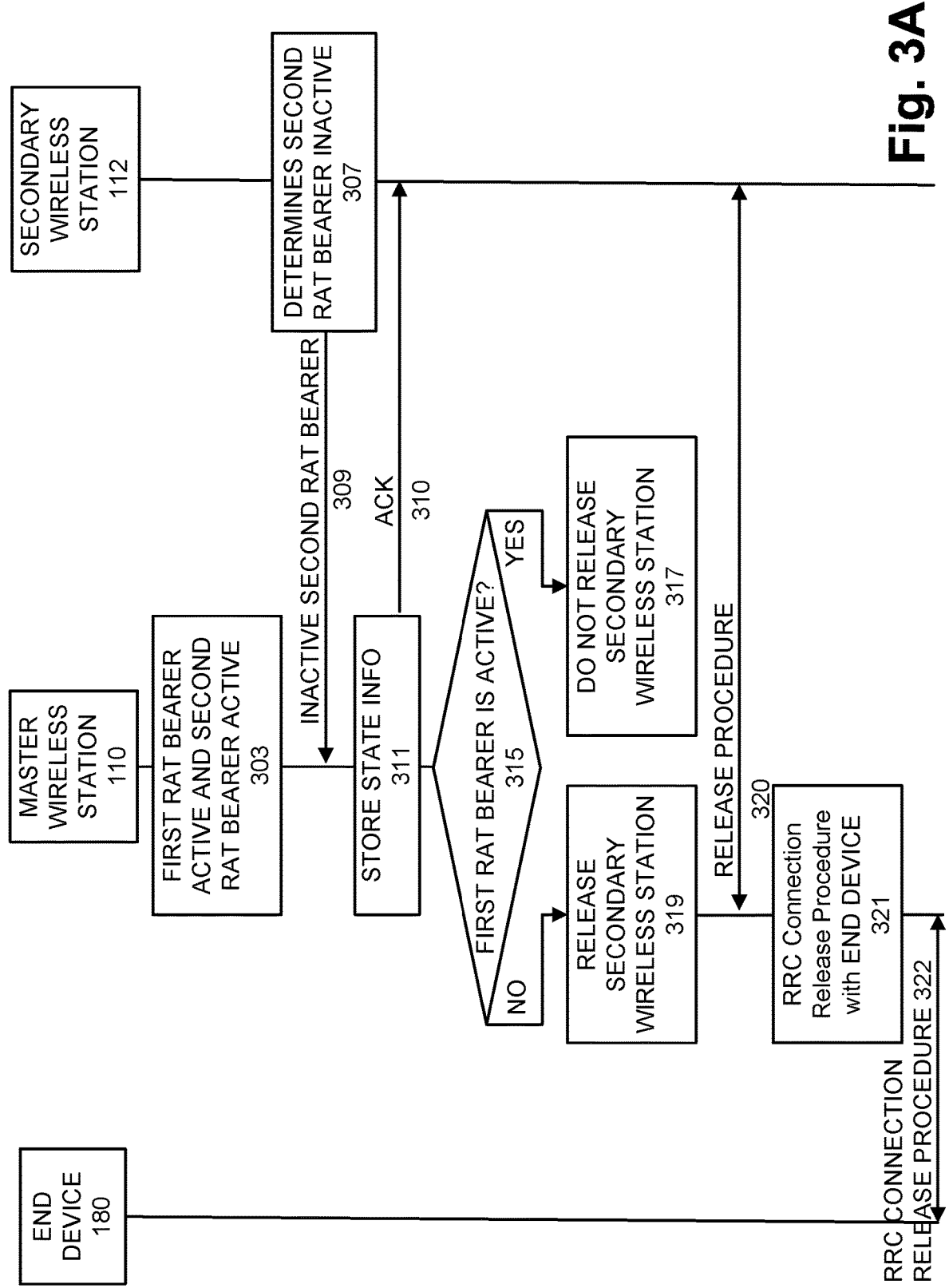
FIGS. 3A-3C are diagrams illustrating exemplary processes of exemplary embodiments of the resource management service according to various exemplary scenarios.
Figure 3B:
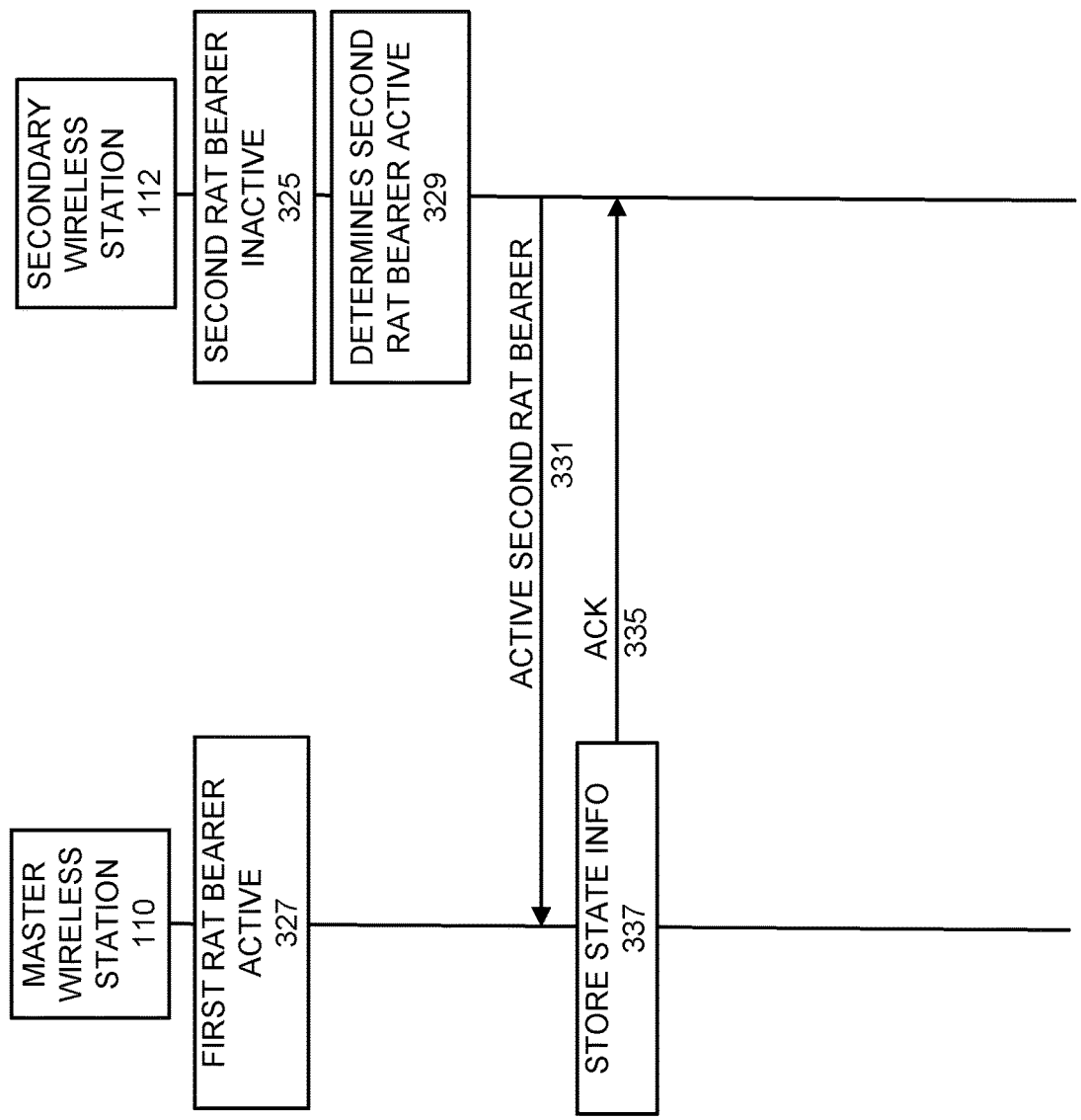
Figure 3C:
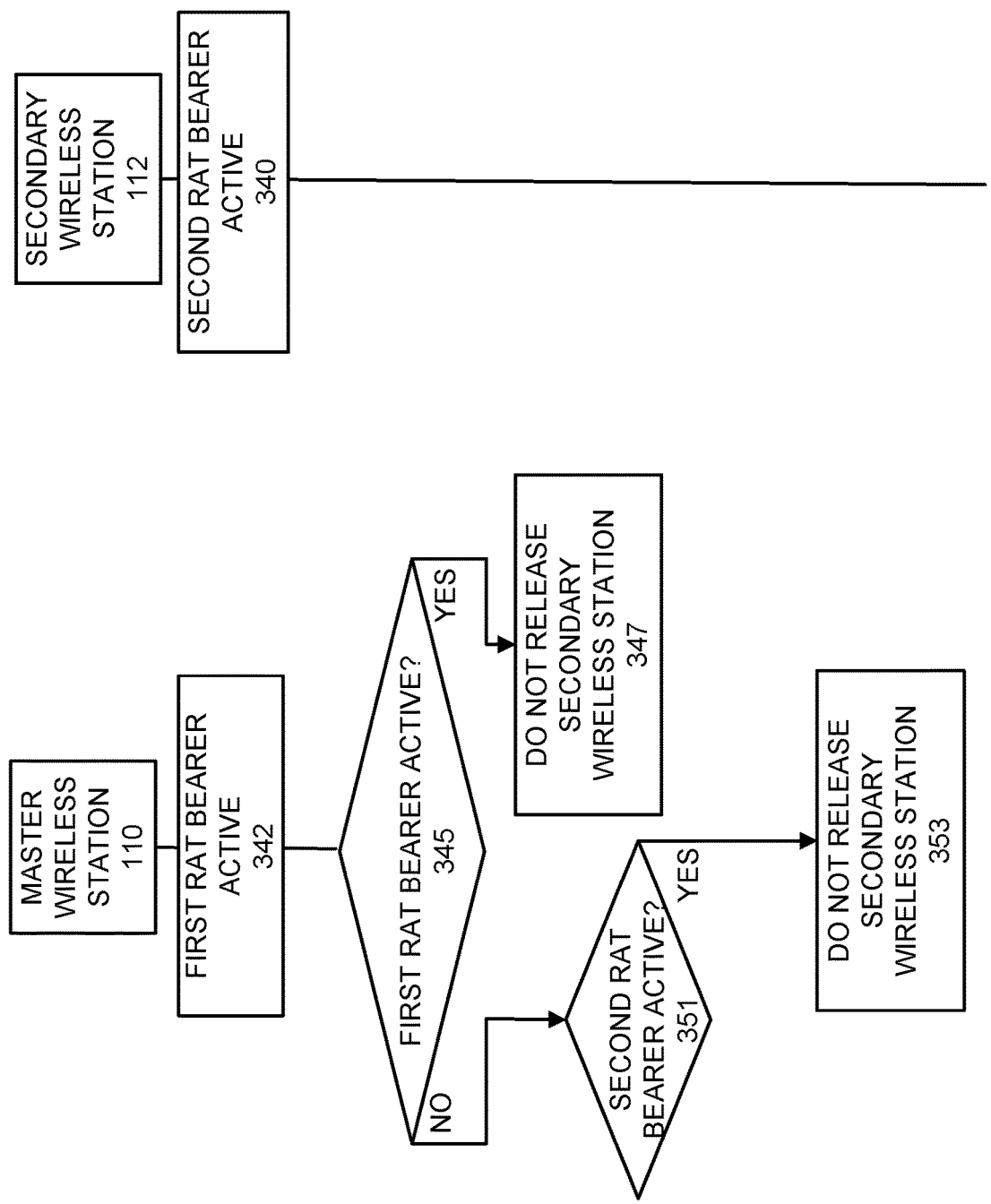

FIGS. 3A-3C are diagrams illustrating still other exemplary processes of the resource management service. Referring to FIG. 3A, assume that master wireless station 110 determines that a first RAT bearer is active and a second RAT bearer is active 303. Subsequently, secondary wireless station 112 determines that the second RAT bearer is inactive 307. In response, secondary wireless station 112 may generate and transmit a message to master wireless station 110. For example, the message may indicate that the second RAT bearer is inactive 309. According to an exemplary implementation, the message may include an information element (IE) that indicates the state of the second RAT bearer (e.g., active or inactive). The message may carry other types of information, such as an identifier of end device 180, an identifier of the second RAT bearer, a time period of activity or inactivity of the second RAT bearer, a date and a timestamp indicating when the state of the second RAT bearer was determined, and/or other information pertaining to the second RAT. The message may carry information pertaining to one or multiple end devices 180.

According to exemplary implementations, secondary wireless station 112 may transmit the message to master wireless station 110 via a control plane or another suitable plane (e.g., user plane, etc.). For example, secondary wireless station 112 may transmit the message via an X2 interface to master wireless station 110. According to other examples, the message may be transmitted via some other suitable interface that may be implemented based on the type of master and secondary wireless stations involved and the architecture of access network 105.

In response to receiving the message, master wireless station 110 may generate and transmit a message to secondary wireless station 112. For example, the message may include an acknowledgement (ACK) 310. Additionally, for example, master wireless station 110 may store the state information 311 of the second RAT bearer/secondary wireless station 112. The state information may include the state of the second RAT bearer and may include other types of information (e.g., end device identifier, secondary wireless station identifier, etc.) which may be included in the message.

As further illustrated, master wireless station 110 may determine whether the first RAT bearer is active 315. When master wireless station 110 determines that the first RAT bearer is active, master wireless station 110 does not release the secondary wireless station 317. On the other hand, when master wireless station 110 determines that the first RAT bearer is inactive (and the second RAT bearer is inactive), master wireless station 110 may determine to release the secondary wireless station 319. For example, master wireless station 110 may invoke an SN release procedure 320 that includes messages exchanged between master wireless station 110 and secondary wireless station 112. Master wireless station 110 may also determine, based on the inactivity of the first RAT bearer and the second RAT bearer, to release the RRC Connection with end device 180. For example, master wireless station 110 may invoke an RRC Connection Release procedure 322 with end device 180 that includes messages exchanged between master wireless station 110 and end device 180. The first RAT bearer and the second RAT bearer may be released.

Referring to FIG. 3B and another exemplary process, assume that the second RAT bearer is inactive 325 at secondary wireless station 112, and the first RAT bearer is active at master wireless station 327. Subsequently, secondary wireless station 112 determines that the second RAT bearer is active 329. In response, secondary wireless station 112 generates and transmits a message 331, which indicates that the second RAT bearer is active, to master wireless station 110. In response to receiving the message, master wireless station 110 may generate and transmit a message to secondary wireless station 112. For example, the message may include an acknowledgement (ACK) 335. Additionally, for example, master wireless station 110 may store the state information 311 of the second RAT bearer/secondary wireless station 112. The state information may include the state of the second RAT bearer and may include other types of information (e.g., end device identifier, secondary wireless station identifier, etc.) which may be included in the message.

Referring to FIG. 3C and yet another exemplary process, assume that the second RAT bearer is active 340 and the first RAT bearer is active 342. Subsequently, master wireless station 110 determines whether the first RAT bearer is active or not 345. When master wireless station 110 determines that the first RAT bearer is active, master wireless station 110 does not release the secondary wireless station 347. When master wireless station 110 determines that the first RAT bearer is not active, master wireless station 110 may determine the state of the second RAT bearer 351, which in this case is active. As a result, master wireless station 110 does not release secondary wireless station 353 from the MCG.

Although FIGS. 3A-3C illustrate an exemplary process of the resource management service, according to other exemplary embodiments, the process may include additional, different, and/or fewer steps, and/or include additional, different, and/or fewer messages. For example, secondary wireless station 112 may omit transmitting a message, which indicates a state, when the state has not changed from a previous reporting. In this way, master wireless station 110 may receive state information from secondary wireless station 112 only when there is a change in state (e.g., from active to inactive, etc.).

Figure 4A:
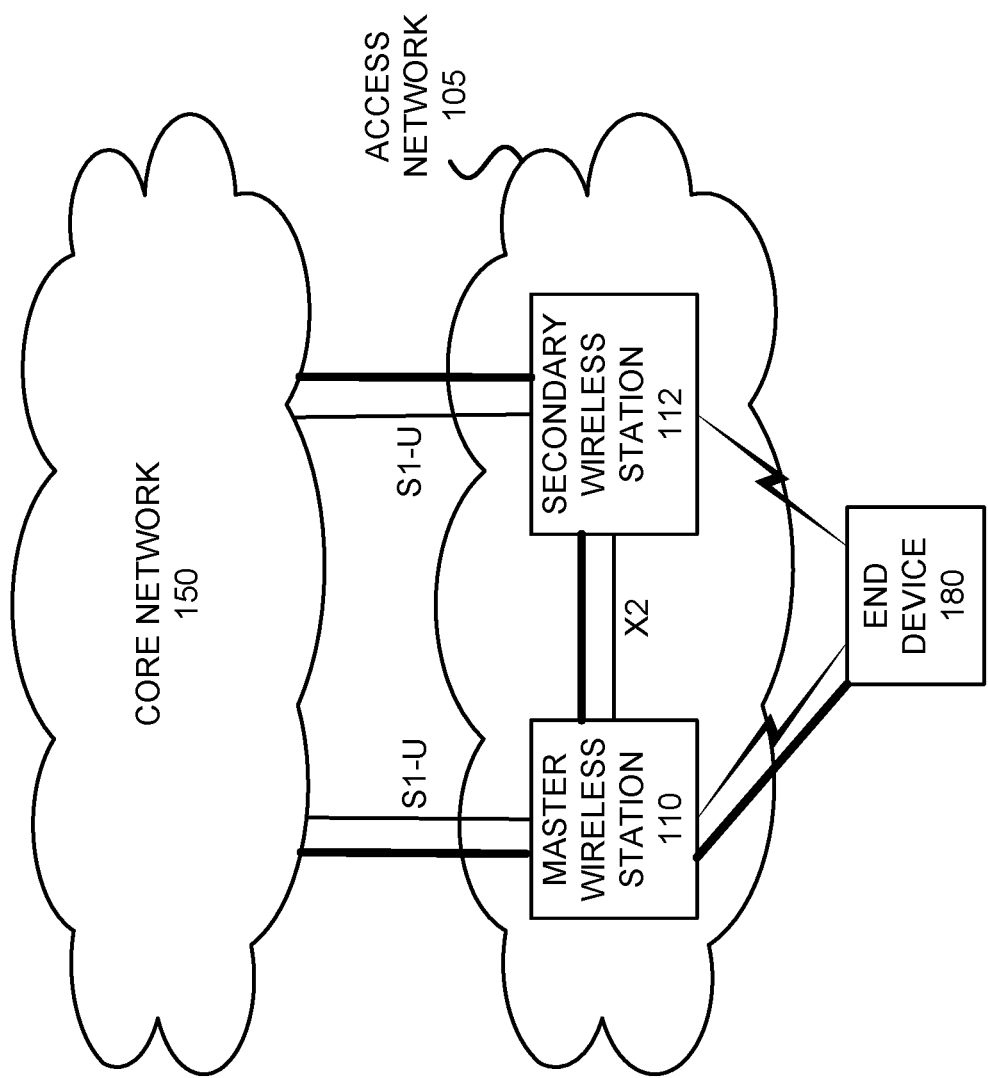
FIG. 4A is a diagram illustrating an exemplary scenario in which an exemplary embodiment of the resource management service may use a split bearer.

According to various exemplary embodiments, absent the inactivity of the DRBs (e.g., at the lower layers) for both master wireless station 110 and secondary wireless station 112 or other circumstances (e.g., changes to termination points), master wireless station 110 may not release secondary wireless station 112 in the DC context. For example, as illustrated in FIG. 4A, when secondary wireless station 112 is inactive and master wireless station 110 is active, master wireless station 110 may use an MCG split bearer through secondary wireless station 112. Thus, for example, in the LTE-NR context, an LTE master wireless station 110 may maintain a split bearer through LTE even after the NR coverage of an NR secondary wireless station 112 may be lost. However, when the Packet Data Convergence Protocol (PDCP) layer (e.g., S1-U termination point) and/or the RRC layer (X2-C termination point) of the secondary wireless station 112 changes, master wireless station 110 may release secondary wireless station 112.

Figure 4B:
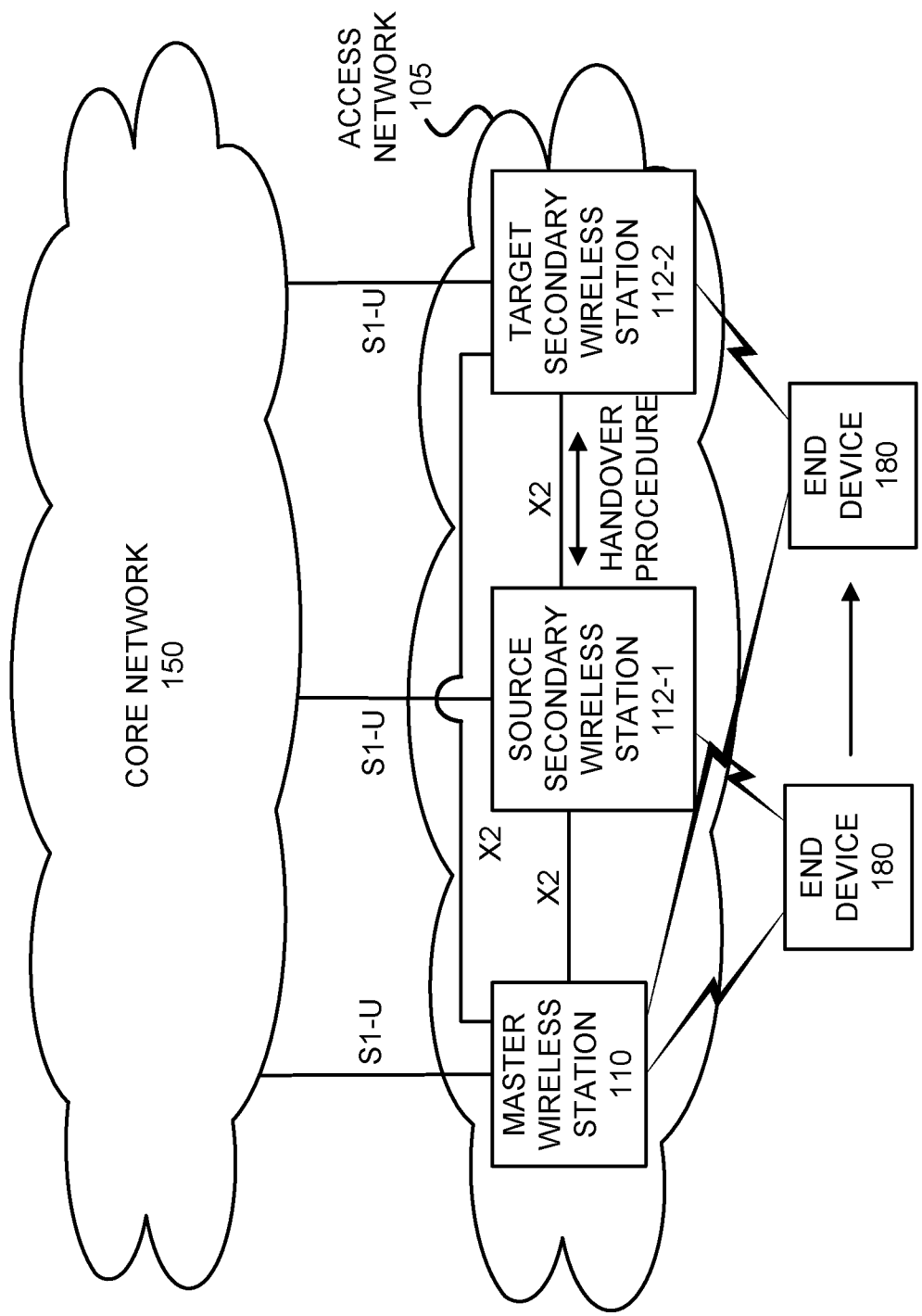
FIG. 4B is a diagram illustrating an exemplary process of an exemplary embodiment of the resource management service in which the secondary wireless station may be released.

Referring to FIG. 4B, mobility of end device 180 may cause master wireless station 110 to release secondary wireless station 112. As illustrated, due to the mobility of end device 180, a handover procedure may be performed between a source secondary wireless station 112-1 and a target secondary wireless station 112-2. According to this exemplary scenario, master wireless station 110 may release source secondary wireless station 112-1 and invoke a secondary node addition procedure with target secondary wireless station 112-2. For example, although not illustrated, master wireless station 110 may select target secondary wireless station 112-2 for DC, and may transmit an addition request to target secondary wireless station 112-2 via the X-2 interface. Target secondary wireless station 112-2 may determine whether radio resources may be allocated, and according to an exemplary scenario when a split bearer may be set up, whether transport network resources may be allocated. Target secondary wireless station 112-2 may generate and transmit a response, which may include acceptance and configuration information, to master wireless station 110.

According to other exemplary scenarios, a release of secondary wireless station 112 may stem from an RRC Connection Release of secondary wireless station 112, which may be initiated by end device 180. For example, the radio bearer release may be initiated by end device 180 because of the expiration of time period in which user data inactivity at end device 180 has occurred (e.g., based on a timer). Alternatively, end device 180 may initiate a release based on poor radio coverage. For example, when radio coverage on a second RAT bearer, from the end device perspective, is low or spotty (e.g., fade in, fade out, etc.), the end device may follow the radio coverage of a first RAT bearer, which in turn may move a DRB to the first RAT bearer. As a consequence, the MN may release the SN from the cell group.

FIG. 5 is a diagram illustrating exemplary components of a device 500 that may be included in one or more of the devices described herein. For example, device 500 may correspond to components included in network devices of access network 105, network devices in a core network, and end device 180. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with master wireless station 110, software 520 may include an application that, when executed by processor 510, provides the functions of the resource management service, as described herein. Additionally, with reference to secondary wireless station 112, software 520 may include an application that, when executed by processor 510, provides the functions of the resource management service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, spun up, spun down, etc., using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
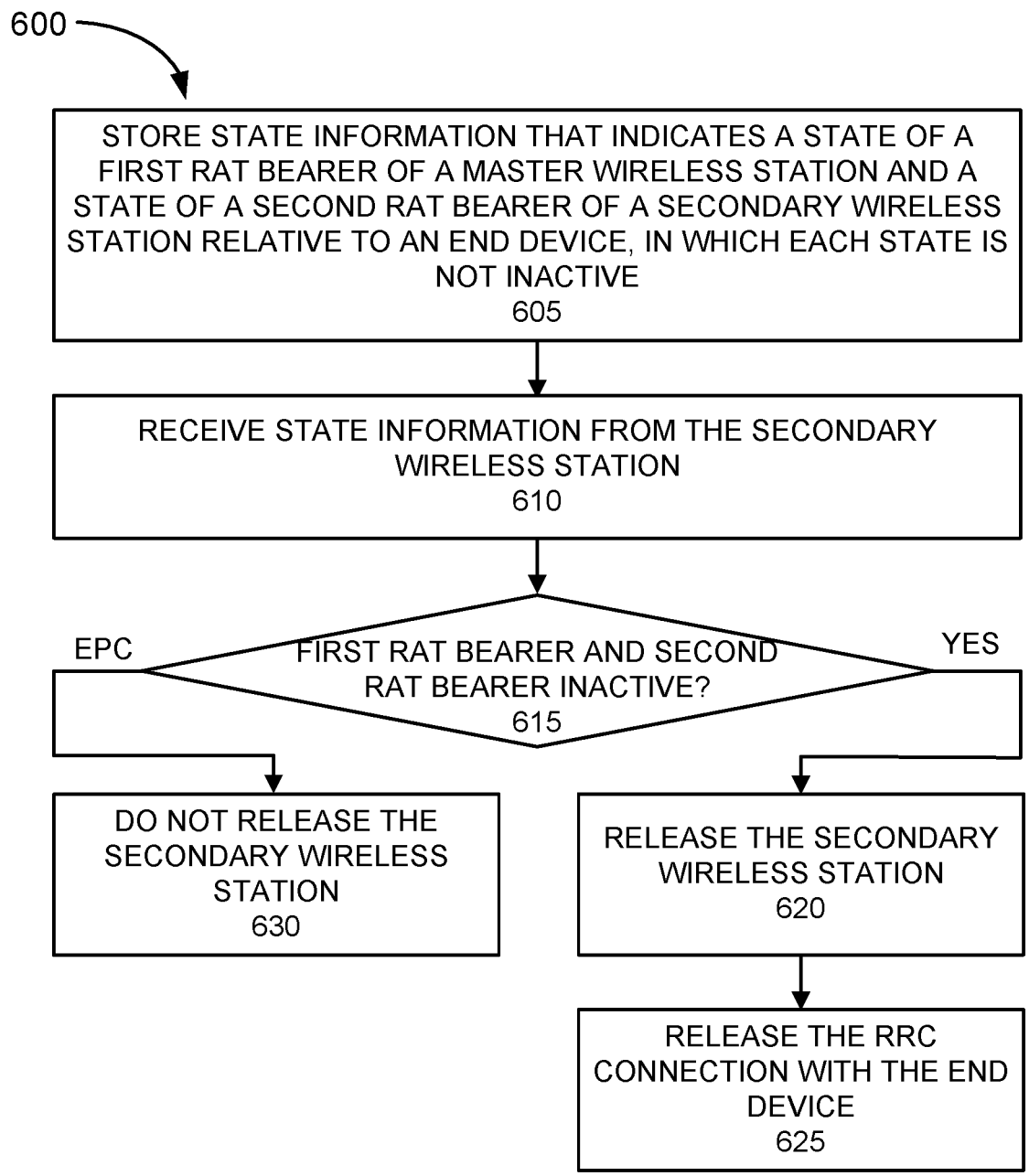
FIG. 6 is a flow diagram illustrating an exemplary process of an exemplary embodiment of the resource management service.

FIG. 6 is a flow diagram illustrating an exemplary process 600 of an exemplary embodiment of the resource management service. According to an exemplary embodiment, a master wireless station in an access network that supports a DC service performs steps of process 600. For example, processor 510 executes software 520 to perform the steps illustrated in FIG. 6, and described herein. It may be assumed that the master wireless station supports a first RAT and a secondary wireless station supports a second RAT.

Referring to FIG. 6, in block 605, state information that indicates a state of a first RAT bearer of a master wireless station and a state of a second RAT bearer of a secondary wireless station relative to an end device, in which each state is not inactive. For example, master wireless station 110 may store state information that indicates a state (e.g., active or inactive) of a first RAT bearer (e.g., a DRB of a lower layer) between master wireless station 110 and end device 180, and a state (e.g., active or inactive) of a second RAT bearer (e.g., a DRB of a lower layer) between secondary wireless station 112 and end device 180. It may be assumed that the states of the first RAT bearer and the second RAT bearer are not both inactive.

In block 610, state information may be received from the secondary wireless station. For example, master wireless station 110 may receive a message, which carries state information, from secondary wireless station 112. As previously described, the state information may include various types of information pertaining to the second RAT bearer, end device 180, etc. Master wireless station 110 may transmit a response, which acknowledges the receipt of the secondary wireless station 112, to secondary wireless station 112. Master wireless station 110 may store the received state information pertaining to secondary wireless station 112-1.

In block 615, it may be determined whether the first RAT bearer and the second RAT bearer are inactive. For example, master wireless station 110 may use the state information to determine the current state of the second RAT bearer. Additionally, for example, master wireless station 110 may use the state information to determine the current state of the first RAT bearer. Alternatively, for example, master wireless station 110 may, in response to receiving the state information from secondary wireless station 112, or based on a schedule of the bearer monitoring service for master wireless station 110, determine whether the first RAT bearer is active or not. For example, master wireless station 110 may determine whether a buffer or another type of memory stores data to be transmitted and/or is currently transmitting pertaining to an end device/session in the uplink and the downlink, and/or apply another criterion, as previously described.

When it is determined that the first RAT bearer and the second RAT bearer are inactive (block 615—YES), the secondary wireless station may be released (block 620). For example, master wireless station 110 may release secondary wireless station 112 from an MCG. In block 625, the RRC connection with the end device may be released. For example, master wireless station 110 may release the first RAT bearer and the second RAT bearer relative to end device 180. Alternatively, master wireless station 110 may release the first RAT bearer and secondary wireless station 112 may release the second RAT bearer.

When it is determined that the first RAT bearer and the second RAT bearer are not inactive (block 615—NO), the secondary wireless station may not be released (block 630). For example, master wireless station 110 may not release secondary wireless station 112 from the MCG. For example, when the first RAT bearer is active and the second RAT bearer is inactive, master wireless station 110 may provide an MCG split bearer service relative to end device 180.

Although FIG. 6 illustrates an exemplary process 600 of the resource management service, according to other embodiments, process 600 may include additional operations, fewer operations, and/or different operations than those illustrated in FIG. 6, and described herein. For example, according to other exemplary embodiments, block 610 may be omitted. For example, in block 605, the state information may indicate that secondary wireless station 112 is inactive and master wireless station 110 is active. Subsequently, master wireless station 110 may perform step 615.

According to various exemplary implementations, the bearer monitoring service of the secondary wireless station may or may not be synchronized (or substantially synchronized) with the bearer monitoring service of the master wireless station or vice versa. In this regard, the state information of a wireless station may or may not be updated in synchronicity with another wireless station, and a determination of whether multiple RAT bearers are inactive may be bear different results.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations. For the purpose of description only, the terms "active" and "inactive" are used. However, other terms may be used to represent the state of the RAT bearer pertaining to the MN and the SN in relation to the end device in view of the criteria for determining active or inactive, as described herein.

In addition, while a series of blocks has been described with regard to the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    storing, by a master wireless station of a radio access network, state information that indicates a state of a first radio access technology (RAT) bearer of the master wireless station relative to an end device, a state of a second RAT bearer of a secondary wireless station relative to the end device, wherein the secondary wireless station is of a master cell group of the master wireless station, and end device information that indicates identifies an application used by the end device and a type of the end device;

determining, by the master wireless station subsequent to the storing, whether the state of the first RAT bearer and the state of the second RAT bearer are inactive based on the state information and the end device information;

releasing, by the master wireless station, the secondary wireless station in response to determining that the state of the first RAT bearer and the state of the second RAT bearer are inactive; and not releasing, by the master wireless station, the secondary wireless station in response to determining that the state of the first RAT bearer and the state of the second RAT bearer are not inactive.

2. The method of claim 1, further comprising:
receiving, by the master wireless station subsequent to the storing but before the determining, a message from the secondary wireless station that includes an indication of a first state of the second RAT bearer of the secondary wireless station; and updating, by the master wireless station, the first state of the second RAT bearer as the state of the second RAT bearer in the state information, and wherein the determining comprises:

determining, by the master wireless station subsequent to the storing and the updating, whether the state of the first RAT bearer and the state of the second RAT bearer are inactive based on the state information and the end device information.

3. The method of claim 1, wherein the end device information includes information indicating a traffic behavior associated with the application.

4. The method of claim 1, further comprising:
determining, by the master wireless station subsequent to the storing but before the determining, a first state of the first RAT bearer; and updating, by the master wireless station, the first state of the first RAT bearer as the state of the first RAT bearer in the state information, and wherein the determining comprises:

determining, by the master wireless station subsequent to the storing and the updating, whether the state of the first RAT bearer and the state of the second RAT bearer are inactive based on the state information and the end device information.

5. The method of claim 4, wherein the determining the first state of the first RAT bearer comprises:
determining, by the master wireless station, whether there is at least one of data of a user plane to be transmitted to the end device in a downlink via the first RAT bearer or data of the user plane received via the first RAT bearer from the end device to be transmitted in an uplink.

6. The method of claim 1, wherein the master wireless station is one of an evolved Node B (eNB) or an Evolved LTE (eLTE) eNB.

7. The method of claim 1, wherein the not releasing comprises:
maintaining, by the master wireless station, a secondary cell group split bearer configuration with the secondary wireless station in relation to the end device, wherein the state of the second RAT bearer is inactive.

8. The method of claim 1, further comprising:
releasing, by the master wireless station, the first RAT bearer and the second RAT bearer relative to the end device to which the first RAT bearer and the second RAT bearer relate, in response to determining that the state of the second RAT bearer and the state of the first RAT bearer are inactive.

9. A network device comprising:
a radio communication interface;
a memory, wherein the memory stores instructions; and
a processor, wherein the processor executes the instructions to:
store state information that indicates a state of a first radio access technology (RAT) bearer of the network device relative to an end device, a state of a second RAT bearer of a secondary wireless station relative to the end device, wherein the secondary wireless station is of a master cell group of the network device, and end device information that identifies an application used by the end device and a type of the end device;

determine, subsequent to the storing, whether the state of the first RAT bearer and the state of the second RAT bearer are inactive based on the state information and the end device information;

release the secondary wireless station in response to a determination that the state of the first RAT bearer and the state of the second RAT bearer are inactive; and not release the secondary wireless station in response to a determination that the state of the first RAT bearer and the state of the second RAT bearer are not inactive.

10. The network device of claim 9, wherein the processor further executes the instructions to:
receive, subsequent to the storing but before determining whether the state of the first RAT bearer and the state of the second RAT bearer are inactive, a message from the secondary wireless station that includes an indication of a first state of the second RAT bearer of the secondary wireless station; and update the first state of the second RAT bearer as the state of the second RAT bearer in the state information, and wherein determining comprises:

determine, subsequent to the storing and the updating, whether the state of the first RAT bearer and the state of the second RAT bearer are inactive based on the state information and the end device information.

11. The network device of claim 9, wherein the end device information includes information indicating a traffic behavior associated with the application.

12. The network device of claim 9, wherein the processor further executes the instructions to:
determine, subsequent to the storing but before determining whether the state of the first RAT bearer and the state of the second RAT bearer are inactive, a first state of the first RAT bearer; and update the first state of the first RAT bearer as the state of the first RAT bearer in the state information, and wherein determining comprises:

determine, subsequent to the storing and the updating, whether the state of the first RAT bearer and the state of the second RAT bearer are inactive based on the state information and the end device information.

13. The network device of claim 12, wherein when determining the first state of the first RAT bearer, the processor further executes the instructions to:

determine whether there is at least one of data of a user plane to be transmitted to the end device in a downlink via the first RAT bearer or data of the user plane received via the first RAT bearer from the end device to be transmitted in an uplink.

14. The network device of claim 9, wherein when not releasing, the processor further executes the instructions to:
maintain a secondary cell group split bearer configuration with the secondary wireless station in relation to the end device, wherein the state of the second RAT bearer is inactive.

15. The network device of claim 9, wherein the network device is one of an evolved Node B (eNB) or an Evolved LTE (eLTE) eNB, and wherein the processor further executes the instructions to:
release the first RAT bearer and the second RAT bearer relative to the end device to which the first RAT bearer and the second RAT bearer relate, in response to the determination that the state of the second RAT bearer and the state of the first RAT bearer are inactive.

16. A non-transitory, computer-readable storage medium storing instructions executable by a processor of a device, which when executed cause the device to:
store state information that indicates a state of a first radio access technology (RAT) bearer of the device relative to an end device, a state of a second RAT bearer of a secondary wireless station relative to the end device, wherein the secondary wireless station is of a master cell group of the device, and end device information that identifies an application used by the end device and a type of the end device;
determine, subsequent to the storing, whether the state of the first RAT bearer and the state of the second RAT bearer are inactive based on the state information and the end device information;
release the secondary wireless station in response to a determination that the state of the first RAT bearer and the state of the second RAT bearer are inactive; and
not release the secondary wireless station in response to a determination that the state of the first RAT bearer and the state of the second RAT bearer are not inactive.

17. The non-transitory, computer-readable storage medium of claim 16, wherein the instructions further comprises instructions to:
receive, subsequent to the storing but before determining whether the state of the first RAT bearer and the state of the second RAT bearer are inactive, a message from the secondary wireless station that includes an indication of a first state of the second RAT bearer of the secondary wireless station; and
update the first state of the second RAT bearer as the state of the second RAT bearer in the state information, and wherein the instructions to determine further comprise instructions to:
determine, subsequent to the storing and the updating, whether the state of the first RAT bearer and the state of the second RAT bearer are inactive based on the state information and the end device information.

18. The non-transitory, computer-readable storage medium of claim 16, wherein the instructions further comprises instructions to:
determine, subsequent to the storing but before determining whether the state of the first RAT bearer and the state of the second RAT bearer are inactive, a first state of the first RAT bearer; and
update the first state of the first RAT bearer as the state of the first RAT bearer in the state information, and wherein the instructions to determine further comprise instructions to:
determine, subsequent to the storing and the updating, whether the state of the first RAT bearer and the state of the second RAT bearer are inactive based on the state information and the end device information.

19. The non-transitory, computer-readable storage medium of claim 18, wherein the instructions to determine the state of the first RAT bearer further comprise instructions to:
determine whether there is at least one of data of a user plane to be transmitted to the end device in a downlink via the first RAT bearer or data of the user plane received via the first RAT bearer from the end device to be transmitted in an uplink.

20. The non-transitory, computer-readable storage medium of claim 16, wherein the end device information includes information indicating a traffic behavior associated with the application.

* * * * *